United States Patent [19]

Murray et al.

[11] 4,012,264
[45] Mar. 15, 1977

[54] EARLY STRENGTH CEMENTS

[75] Inventors: Ransom James Murray, Gravesend; Arthur William Brown, London, both of England

[73] Assignee: The Associated Portland Cement Manufacturers Limited, London, England

[22] Filed: Mar. 25, 1975

[21] Appl. No.: 561,881

Related U.S. Application Data

[63] Continuation of Ser. No. 386,625, Aug. 8, 1973, abandoned.

[30] Foreign Application Priority Data

Aug. 16, 1972 United Kingdom ............ 38202/72

[52] U.S. Cl. .................................. 106/89; 106/104
[51] Int. Cl.² .................. C04B 7/02; C04B 7/32
[58] Field of Search ............ 106/64, 89, 104, 314

[56] References Cited

UNITED STATES PATENTS

| | | | |
|---|---|---|---|
| 2,911,311 | 11/1959 | Feagin et al. | 106/104 |
| 3,360,594 | 12/1967 | Criss | 106/64 |
| 3,607,325 | 9/1971 | Spangler | 106/64 |
| 3,645,750 | 2/1972 | Sadran | 106/104 |
| 3,664,854 | 5/1972 | Kokuta | 106/104 |
| 3,705,815 | 12/1972 | Alegre et al. | 106/104 |

*Primary Examiner* — J. Poer
*Attorney, Agent, or Firm* — Baldwin, Wight & Brown

[57] ABSTRACT

An early strength hydraulic cement is disclosed in which a clinker rich in $C_{12}A_7$ and poor in CA or $C_3A$ interground with Portland cement clinker, the resultant early strength cement including at least 10% by weight of $C_{12}A_7$ with a majority of the balance being calcium silicates and including at least 10% by weight of $C_3S$.

12 Claims, No Drawings

EARLY STRENGTH CEMENTS

This is a continuation of application Ser. No. 386,625, filed Aug. 8, 1973, now abandoned.

This invention relates to early strength cements, that is, cements which set and harden unusually rapidly in order to give appreciable strength very soon after use.

It is known that a very rapidly setting and hardening cement can be produced by mixing Portland cement and high alumina cement, and/or by the use of various accelerators. By high alumina cement is meant cement in which the principal hydraulic constituent is monocalcium aluminate (CA). The improvement obtained in early strength is generally at some expense in the ultimate strength of the cement obtained, but the main disadvantage of known methods of obtaining early strength is that when very rapid setting and hardening is required, it is difficult to obtain consistent and reproducible results, the actual rate of setting and hardening being insufficiently controllable, particularly when making a concrete with an aggregate contaminated with or containing substances capable of acting as accelerators or retarders since very small quantities of such substances can have a drastic effect on the setting times achieved. A further disadvantage of rapid setting Portland cements in which accelerators have been incorporated is that many of the applications in which rapid setting cements are most useful are those which may involve the pumping of a slurry of the cement or a concrete containing it, and such Portland cements do not give good results with higher than normal water to cement ratios. High alumina cements on the other hand are expensive.

It is known that the calcium aluminate of the formula 12 Ca0.7 Al$_2$O$_3$, commonly abbreviated to C$_{12}$A$_7$, has the property of setting and hardening almost instantaneously upon admixture with water. For this reason, it has been sought to avoid the formation of C$_{12}$A$_7$ during the production of high alumina cements because of the substantial and unpredictable acceleration of setting and hardening that may be caused by the presence of quite small proportions of C$_{12}$A$_7$.

Surprisingly, we have found that by utilising C$_{12}$A$_7$ to provide a substantial proportion of the hydraulic constituents of a cement which does not have a large CA content, usually together with retarders and/or accelerators selected and proportioned to provide a desired delay in setting to enable working, it is possible to obtain a rapidly setting and hardening cement giving concretes having acceptable early strength but at the same time having a setting time which is controllable even in the presence of contaminants.

According to the invention therefore, an early strength hydraulic cement comprises C$_{12}$A$_7$ forming 7–90%, usually 10–70% and preferably 15%–30%, by weight of its content of hydraulic constituents, a majority of the balance being hydraulic calcium silicates. Preferably the cement includes retarders and/or accelerators effective to provide a desired setting time sufficient for the purpose for which the cement is intended. The preferred retarders are conventional organic retarders for Portland cements such as citric acid, lignosulfonates or sugars.

The preferred accelerators can be additions made to the raw feed such as alkali metal compounds which are retained within the clinker in the form of alkali metal sulphates during burning or form solid solutions within the primary phases present; or additions made at the grinding stage or blended into the final cement, such as K$_2$SO$_4$ or K$_2$SO$_4$. 2CaSO$_4$, conventional accelerators for Portland cement, or grinding aids such as a mixture of triethanolamine and acetic acid or commercially available organic based grinding aids.

Preferably small quantities of calcium sulphate in the form of natural or synthetic gypsums and anhydrites are incorporated in the cement in order to obtain optimum strength development. These additions slightly retard the set, but further retardation is possible with conventional organic retarders as mentioned above. In some instances the addition during grinding of a small quantity of water will provide a retarding action.

The cement preferably comprises a mixture of a cement prepared from a clinker produced by selecting and fusing or sintering a mixture of siliceous, calcareous and aluminous material proportioned to yield a product rich in C$_{12}$A$_7$ and poor in CA or C$_3$A (these two phases normally cannot occur together) with a conventional Portland cement, calcium sulphate and the selected retarders or accelerators.

The accelerators may be added to the raw feed during manufacture of one or both clinkers, or accelerators and/or retarders added at the grinding stage or to the final cement, according to known practice appropriate to the nature of the retarders or accelerators involved. Preferably, the C$_{12}$A$_7$ rich clinker is ground together with a Portland cement clinker and a calcium sulphate sufficient to give an SO$_3$ content of up to 7.5% by weight of the final cement, including the SO$_3$ content of the clinkers and a small amount of a retarder or accelerator in accordance with the setting properties required.

In a typical case, a clinker is prepared using a raw feed mix containing kaolinitic clay (china clay, ball clay or fire clay), chalk or limestone, and bauxite or an alternative alumina rich compound, proportioned so as to give a potential yield of C$_{12}$A$_7$ in the fired clinker which is in the range 39 to 50% by weight, this range being calculated by relating the oxide analysis of the clinker to the SiO$_2$, Al$_2$O$_3$, CaO, Fe$_2$O$_3$ phase diagram. The presence of small amounts of impurities or additions in the raw materials may be advantageous when such impurities or deliberate additions (a) aid in the combination of the raw materials during firing (e.g., materials comprising or yielding Ma$_2$O, K$_2$O, TiO$_2$, MgO or Mn$_2$O$_3$ on firing), or (b) enter into solid solution and stabilize the β- C$_2$S phase and prevent its reversion to the γ form with resultant excessive dusting during grinding (e.g., materials comprising or yielding Na$_2$O, K$_2$O, B$_2$O$_3$ or P$_2$O$_5$ on firing) or (c) enhance the strength of the C$_2$S or C$_{12}$A$_7$ phases (e.g., materials comprising or yielding Na$_2$O, K$_2$O on firing or alkali metal sulphates).

On firing such a mixture at a temperature sufficiently above 1250° C to provide an uncombined lime content of less than 5%, a clinker is obtained in which the presence of C$_{12}$A$_7$ can be confirmed by X-ray diffraction, the major calcium silicate phase present being dicalcium silicate (C$_2$S), whilst a calcium alumino ferrite, magnesia, alkali metal sulphates and alkali metal/calcium double sulphates and uncombined lime are present in minor quantities.

The resulting clinker may be ground with a Portland cement clinker, up to 7.5% of SO$_3$ as a calcium sulphate, and a small amount, ascertained by trial according to the setting and hardening time required, of an additional accelerator or retarder, typically citric acid, or another organic hydroxy acid, to a surface area typically in the range 225–600 m²/kg., as specified by the air permeability test according to British Standard Specification 12 (1971). Alternatively, the $C_{12}A_7$ rich clinker may be ground with the gypsum and accelerator or retarder, and then blended for use with either an ordinary or a rapid hardening Portland cement in a proportion according to the setting time and ultimate strength required. A further possibility is to omit the retarder and to supply this separately so that the user of the cement may add it during mixing in order to suit the setting time and hardening rate to his own requirements. In a typical case potassium sulphate might be blended or ground with the cement as an accelerator, and citric acid might be added as a retarder by the user on mixing, dissolved in the mixing water.

Although the $C_{12}A_7$ rich clinker, usually with the addition of gypsum and accelerators or retarders, could be utilised on its own, a cheaper product is obtained when it is blended with Portland cement. Such a blended product can have higher early strength and better strength development than cements formed from the $C_{12}A_7$ rich clinker alone, if the $C_{12}A_7$ content of the final cement is 15–30% by weight and the $C_3S$ content is 10–70% by weight. The higher $C_3S$ contents in this range tend to provide poorer early strength, but higher ultimate strength.

One application for cements according to the invention is in the production of rapid setting very early strength concretes, employing a good quality aggregate, and in fibre reinforced composite materials. However, the cements of the invention find special utility as a binder for poor quality and contaminated aggregates containing impurities which act as a severe retarder of set for normal quick setting Portland cements and which render the behavior of blends of Portland and high alumina cement unacceptably erratic. The effect of such impurities on concretes made from cements in accordance with the invention is much less than on conventional quick setting Portland cements or blends of Portland cement and high alumina cement and this property combined with the ability of the new cements to be utilized with higher than normal water to cement ratios makes them particularly useful where it is required to bond a wet and/or contaminated aggregate or where a cement slurry is to be pumped in such applications as in soil stabilization, the grouting of unstable earthworks or rock formations. One particular example of a poor quality aggregate, with which cements according to the present invention are effective, is material from coal measures, even when contaminated with or containing or considering of coal, the organic constituents of which can have a considerable but unpredictable effect upon the behavior of known rapidly hardening cements. Another application for cements in accordance with the inventions is as a bonding agent in the agglomeration of ores and foundry sands.

The preparation and use of cements in accordance with the invention is illustrated in the following Examples in which all percentages and proportions are by weight.

EXAMPLE 1

A clinker rich in $C_{12}A_7$ was prepared as follows. A limestone whose principal constituents were $SiO_2$ 1.4%, $Al_2O_3$ 0.7%, $Fe_2O_3$ 0.7% and $CaO$ 53.7%, a china clay whose principal constituents were $SiO_2$ 48.2%, $Al_2O_3$ 36.0% $Fe_2O_3$ 1.1% and $CaO$ 0.1% and a calcined bauxite whose principal constituents were $SiO_2$ 13.2%, $Al_2O_3$ 78.2%, $Fe_2O_3$ 2.7% and $CaO$ 0.5% were blended to form a raw feed in the approximate proportions 71.5% limestone, 23.0% china clay and 5.5% bauxite, and ground in a ball mill to a residue of 7.8% on a BS170 (90 $\mu$) sieve, the raw feed being adjusted to give a carbonate percentage of 68.6 ± 0.2 and a silica ratio of 0.83 ± 0.2 and a silica ratio of 0.83 ± 0.5.

The raw feed was sintered in a rotary coal fixed kiln at 1300° C to give a free lime content of 0.8%. As a result of ash absorbtion during sintering, the final clinker had an analysis as follows:

$SiO_2$ 20.2%, $Al_2O_3$ 19.1%, $Fe_2O_3$ 1.7%, $Mn_2O_3$ 0.03%, $P_2O_5$ 0.12%, $TiO_2$ 0.23%, $CaO$ 57.1%, $MgO$ 0.5%, $SO_3$ 0.51%, $K_2O$ 0.20% and $Na_2O$ 0.10%.

The lime saturation factor of the clinker was 0.709, the silica ratio 0.97, the alumina ratio 11.23, and the free lime content 0.8%.

The potential phase analysis of the clinker was $C_{12}A_7$ 35%, $C_2S$ 58%, $C_4AF$ 5%, magnesia, free lime and other minor phases to 100%.

Cements were prepared by intergrinding 60% by weight of the $C_{12}A_7$ rich clinker, prepared as described above, together with 40% of a Portland cement clinker specified below, gypsum and citric acid, to a surface area of 450 m²/kg measured by the air permeability method according to B.S.S. 12 (1971), so as to provide a potential phase composition taking into account only the clinkers and as calculated from the oxide analyses of the two clinkers of 21% $C_{12}A_7$, 28% $C_3S$, 36.8% $C_2S$, 8.6% $C_4AF$ and $C_3A$ 2.3% with magnesia, uncombined line and other phases to 100%. The quantity of gypsum added was such as to give, except where otherwise specified in the following Examples 2–11, a total $SO_3$ content, attributable both to the added gypsum and to alkali sulphates present in the clinker, of 2.5% by weight as determined by analysis, whilst the amount of citric acid added was as specified in the following individual examples 2–11.

The Portland cement clinker used in this and in the cements of all the following examples except Example 14 had an analysis as follows:

$SiO_2$ 20.2%, $Al_2O_3$ 5.1%, $Fe_2O_3$ 4.6%, $Mn_2O_3$ 0.11%, $P_2O_5$ 0.16%, $TiO_2$ 0.11%, $CaO$ 65.0%, $MgO$ 0.9%, $SO_3$ 1.0%, $K_2O$ 0.93%, $Na_2O$ 0.37%.

It had a lime saturation factor of 0.99, a silica ratio of 2.08, an alumina ratio of 1.11, a free lime content of 1.8% and a potential phase analysis as follows:

$C_4AF$ 14%, $C_3A$ 5.8%, $C_2S$ 5.0% and $C_3S$ 70.1%

EXAMPLE 2

The cement of Example 1 was tested for setting time according to British Standard Specification 12 (1971), the cement containing 0.25% by weight of citric acid, giving a time to initial set (% consistency water 27%) of 15 minutes, and a time to final set (% consistency water 27%) of 20 minutes.

The pumpability time of a paste having a water/cement ratio of 0.5 was 18 minutes. A concrete used in compressive strength tests was made up from 1 part by weight cement, 2.5 parts by weight Mountsorrel granite, 3.5 parts by weight Curtis sand, and 0.6 parts by weight water. The test results were as follows for the compressive strength of 100 mm concrete cubes:

| After 1 hour | 600 p.s.i. |
|---|---|

-continued

| | | | |
|---|---|---|---|
| 2 | hours | 720 | " |
| 4 | " | 770 | " |
| 8 | " | 740 | " |
| 16 | " | 770 | " |
| 24 | " | 780 | " |
| 3 | days | 780 | " |
| 7 | " | 1040 | " |
| 28 | " | 1910 | " |
| 3 | months | 3710 | " |
| 6 | " | 3800 | " |

EXAMPLE 3 a. The cement of Example I, containing 0.3% by weight of citric acid, was used as a binder for a coal shale; the overall composition of the mix being 1 part by weight cement, 6 parts by weight dry shale, and 1.5 parts by weight water. The setting time of the slurry produced was approximately 80 minutes, and the compressive strength of 100 mm cubes of the mix was 70 p.s.i. after 4 hours, and 170 p.s.i. after 24 hours.

b. When the overall water content was increased to 2 parts, the proportions of the other constituents being unchanged, the setting time increased to approximately 90 minutes, and the compressive strength of 100 mm cubes of the mix was

| | | | |
|---|---|---|---|
| After 2 | hours | 90 | p.s.i. |
| 4 | " | 105 | " |
| 24 | " | 130 | " |
| 3 | days | 140 | " |
| 7 | " | 150 | " |
| 28 | " | 320 | " |
| 3 | months | 340 | " |
| 6 | " | 350 | " | c. The compressive strength tests of Example 3 (b) were repeated except that the cubes were demoulded 24 hours after placing and cured in water at room temperature. The compressive strength of the cubes was:

| | | | |
|---|---|---|---|
| After 2 | days | 110 | p.s.i. |
| 3 | " | 110 | " |
| 7 | " | 120 | " |
| 28 | " | 160 | " |
| 3 | months | 275 | " |
| 6 | " | 295 | " |

EXAMPLE 4

Example 3(b) was repeated, except that the cement contained no citric acid, and the coal shale and cement were initially mixed dry before water was added and the final mix placed. The approximate setting time was 15 minutes and the compressive strengths of the cubes were:

| | | | |
|---|---|---|---|
| After 1 | hour | 50 | p.s.i. |
| 4 | hours | 100 | " |
| 24 | " | 150 | " |

EXAMPLE 5

A small addition of potassium sulphate ($K_2SO_4$) was made to the raw feed used in Example I in the manufacture of the $C_{12}A_7$ rich clinker such that the $K_2O$ and $SO_3$ contents of the clinker after firing were increased by 0.5% and 0.2% respectively. The clinker was ground with Portland cement clinker and gypsum to give a composition otherwise as described above and 0.4% by weight of citric acid was added to the cement.

A paste prepared from the cement with a water/cement ratio of 0.5 had a pumpability time of 17 minutes.

When the cement was used as a binder for coal shale as in Example 3(b), the approximate setting time was 50 minutes and the compressive strengths were:

| | | | |
|---|---|---|---|
| After 2 | hours | 100 | p.s.i. |
| 4 | " | 130 | " |
| 24 | " | 150 | " |

EXAMPLE 6

A small addition of calcium phosphate was made to the raw feed used in Example I in the manufacture of the $C_{12}A_7$ rich clinker such that 1.5% $P_2O_5$ was retained within this clinker as a $\beta$-$C_2S$ stabilizer after firing. The clinker was ground, blended and tested as in the previous example except that only 0.2% by weight of citric acid was added to the cement.

A paste prepared from the cement with a water/cement ratio of 0.5 had a pumpability time of 17 minutes.

When the cement was used as a binder for coal shale as in Example 3(b), the approximate setting time was 50 minutes, and the compressive strengths were:

| | | | |
|---|---|---|---|
| After 2 | hours | 100 | p.s.i. |
| 4 | " | 120 | " |
| 24 | " | 145 | " |

EXAMPLE 7

The cement of Example I was modified by replacing half the gypsum added at the grinding stage by potassium sulphate, the total $SO_3$ content of the cement being raised to 2.5% as before. 0.6% citric acid was added to the cement. A paste prepared from the cement with a water/cement ratio of 0.5 had a pumpability time of 17 minutes, whilst when the cement was used as in Example 3(b) as a binder for coal shale, the approximate setting time was 60 minutes, and the compressive strengths were:

| | | | |
|---|---|---|---|
| After 2 | hours | 150 | p.s.i. |
| 4 | " | 155 | " |
| 24 | " | 170 | " |

EXAMPLE 8

The cement of Example I was modified by adding a mixture of 0.15% by wt. of the final cement of triethanolamine and 0.07% by wt. of the final cement of acetic acid, as a grinding aid, to the $C_{12}A_7$ rich clinker, Portland cement clinker and gypsum before grinding. 0.5% citric acid was added to the cement which was tested as in the previous example.

The paste with a water/cement ratio of 0.5 had a pumpability time of 16 minutes.

The approximate setting time was 45 minutes.

The compressive strengths of a bonded coal shale slurry produced as in Example 3(b) were:

| After 2 | hours | 160 | p.s.i. |
|---|---|---|---|
| 4 | " | 180 | " |
| 24 | " | 190 | " |

EXAMPLE 9

The cement of Example I, but containing no citric acid, was admixed with sand and molasses to make up a conventional foundry sand in which the quantity of cement was 7.8% by weight. The compressive strengths of 2 × 2 inch air cured cylinders formed from the foundry sand were:

| After 1 | hour | 70 | p.s.i. |
|---|---|---|---|
| 3 | hours | 250 | " |
| 6 | " | 285 | " |
| 24 | " | 295 | " |

EXAMPLE 10

The cement of Example I, containing no citric acid, was used as a binder for ground iron ore by producing a mix of 8 parts by wt. iron ore, 1 part by wt. cement and 1 part by wt. water, and hand shaping ¾ inch diameter nodules. The breaking loads after air-curing of the nodules were:

| After 2 | hours | 36 | lbf |
|---|---|---|---|
| 6 | " | 50 | " |
| 24 | " | 73 | " |
| 48 | " | 75 | " |

EXAMPLE 11

A cement was prepared by intergrinding 30% by weight of a $C_{12}A_7$ rich clinker, prepared as in Example I but with the constituents in the raw feed reproportioned so as to give a potential $C_{12}A_7$ content in the clinker of 43%, with 70% by weight of the Portland cement clinker specified in Example I, gypsum and citric acid to a surface area of 450 m²/Kg, the potential phase composition ignoring the gypsum and as calculated from the oxide analyses of the two clinkers, being 50% $C_3S$, 14% $C_2S$, 7.5% $C_3A$, 10% $C_4AF$ and 13% $C_{12}A_7$, with magnesia, uncombined lime and other phases to 100%. The quantity of gypsum added was such as to give a total $SO_3$ content attributable to both added gypsum and to sulphates present in the clinker of 2.5% by weight, whilst the amount of citric acid added was 0.3% in the cement.

A paste made from this cement with a water/cement ratio of 0.5 has a pumpability time of 17 minutes.

When used as a binder for coal shale, using 1 part by weight cement, 6 parts by weight shale and 2 parts by weight water to form a slurry, the approximate setting time of the mix was 35 minutes. The compresive strengths of 100 mm cubes were:

| After 2 | hours | 60 | p.s.i. |
|---|---|---|---|
| 4 | " | 60 | " |
| 24 | " | 60 | " |

EXAMPLE 12

A cement was prepared by intergrinding 50% by weight of a $C_{12}A_7$ rich clinker, prepared as in Example I but with the raw feed constituents reproportioned to give a potential $C_{12}A_7$ content of 60%, with 50% by weight of the Portland cement clinker specified in Example I, gypsum and citric acid to a surface area of 450 m²/Kg. The potential phase analysis calculated as in the previous example was 36% $C_3S$, 14% $C_2S$, 10% $C_3A$, 8% $C_4AF$ and 30% $C_{12}A_7$ together with magnesia, free lime and other phases to 100%. The quantity of gypsum added was such as to give a total $SO_3$ content of 2.5%, and the citric acid content was 0.5%. A paste made from this cement with a water/cement ratio of 0.5 had a pumpability time of 16 minutes. When used as a binder for a coal shale as in Example 11, the approximate setting time of the slurry was 25 minutes. The compressive strengths of 100 mm cubes were:

| After 2 | hours | 160 | p.s.i. |
|---|---|---|---|
| 4 | " | 175 | " |
| 24 | " | 205 | " |

EXAMPLE 13

A cement was prepared by intergrinding 75% by weight of a $C_{12}A_7$ rich clinker, prepared as in Example I but with the raw feed consitutents reproportioned to give a potential phase analysis of 25% $C_2S$, 1.2% $C_4AF$, 69% $C_{12}A_7$, possible traces of $C_3A$ or $C_3A$ or $C_3S$, with magnesia, lime and other phases to 100%, with 25% by weight of the Portland cement clinker specified in Example I, gypsum and citric acid to a surface area of 460 m²/Kg. The potential phase analysis of the cement calculated as in Example 11 as 18% $C_3S$, 20% $C_2S$, 1.4% $C_3A$, 4.4% $C_4AF$, 52% $C_{12}A_7$, together with magnesia, free lime and other phases to 100%. The gypsum content was adjusted so that the total $SO_3$ content was 2.5% by weight and the citric acid content was 0.4% by weight. A paste made from this cement with a water/cement ratio of 0.5 had a pumpability time of 17 minutes. When used as a binder for coal shale as in Example 11, the approximate setting time of the slurry was 15 minutes. The compressive strengths of 100 mm cubes were:

| After 2 | hours | 140 | p.s.i. |
|---|---|---|---|
| 4 | " | 160 | " |
| 24 | " | 200 | " |

EXAMPLE 14

A cement was prepared by the $C_{12}A_7$ rich clinker specified in Example 13 with gypsum and citric acid to a surface area of 430 m²/Kg. The gypsum content was such as to give 2.5% by weight $SO_3$ in the final cement, and 1% by weight citric acid was added. A paste made from this cement with a water cement ratio of 0.5 had a pumpability time of 14 minutes. When used as a binder for coal shale as in Example 11, the approximate setting time of the slurry was 25 minutes. The compressive strengths of 100 mm cubes were:

| After 2 hours | 70 | p.s.i. |
|---|---|---|
| 4 " | 145 | " |
| 24 " | 250 | " |

EXAMPLE 15

A cement was prepared by intergrinding 20% by weight of a $C_{12}A_7$ rich clinker, prepared as in Example 1 but with the raw feed constituents reproportioned to give a potential $C_{12}A_7$ content of 50%, with 80% by weight of the Portland cement clinker specified in Example 1, gypsum and citric acid, when utilised, to a surface area of 450 m²/Kg. The potential phase analysis calculated as in Example 11 was 58% $C_3S$, 9% $C_2S$, 7% $C_3A$, 11% $C_4AF$, 10% $C_{12}A_7$, together with magnesia, free lime and other phases to 100%. The gypsum content was such as to give an $SO_3$ content in the final cement of 2.5% by weight, and, without a citric acid addition, the setting times (tested as specified in B.S.S. 12 (1971) were:

| % consistency water | 32.5% |
|---|---|
| Initial set | 10 minutes |
| Final set | 15 minutes |

A paste made from this cement with a water/cement ratio of 0.5 had a pumpability time of 10 minutes.

With 0.3% citric acid added to the cement a concrete was made and tested as in Example 1.

The compressive strengths were:

| After 2 hours | 310 | p.s.i. |
|---|---|---|
| 4 " | 412 | " |
| 24 " | 425 | " |

We claim:

1. An early strength hydraulic cement comprising a mixture of a cement prepared from a clinker rich in $C_{12}A_7$ and poor in other calcium-aluminum compounds such as CA or $C_3A$ with a Portland cement, said mixture including at least 10% by weight of $C_{12}A_7$, a majority of the balance comprising calcium silicates and including at least 10% by weight of $C_3S$.

2. A cement according to claim 1, comprising 15-30% by weight of $C_{12}A_7$.

3. A cement according to claim 2, comprising 10-70% by $C_3S$.

4. A cement according to claim 1 which comprises a $C_{12}A_7$ rich clinker interground with Portland cement clinker.

5. A cement according to claim 1, wherein the clinker rich in $C_{12}A_7$ incorporates a $\beta$-$C_2S$ stabilizer.

6. A cement according to claim 5, wherein the $\beta$-$C_2S$ stabilizer is $P_2O_5$.

7. A cement according to claim 1 incorporating sufficient calcium sulfate to give a total $SO_3$ content of up to 7.5% by weight in the finished cement.

8. A cement according to claim 3 incorporating sufficient calcium sulphate to give a total $SO_3$ content of about 2.5% in the finished cement.

9. A cement according to claim 1 incorporating a setting retarder.

10. A cement according to claim 9 wherein the retarder is citric acid.

11. A cement according to claim 1 incorporating a setting accelerator.

12. A cement according to claim 11 wherein the accelerator is potassium sulphate.

* * * * *